(12) United States Patent
Tanaka et al.

(10) Patent No.: US 8,164,410 B2
(45) Date of Patent: Apr. 24, 2012

(54) LOW-LOSS FERRITE AND ELECTRONIC DEVICE FORMED BY SUCH FERRITE

(75) Inventors: Satoru Tanaka, Tottori (JP); Takeshi Tachibana, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/596,296

(22) PCT Filed: Apr. 16, 2008

(86) PCT No.: PCT/JP2008/057455
§ 371 (c)(1),
(2), (4) Date: Oct. 16, 2009

(87) PCT Pub. No.: WO2008/133152
PCT Pub. Date: Nov. 6, 2008

(65) Prior Publication Data
US 2010/0085140 A1  Apr. 8, 2010

(30) Foreign Application Priority Data

Apr. 17, 2007 (JP) ................................. 2007-108376

(51) Int. Cl.
H01F 27/24 (2006.01)
H01F 27/02 (2006.01)
H01F 5/00 (2006.01)
H01F 27/28 (2006.01)
H01F 1/00 (2006.01)

(52) U.S. Cl. .......... 336/233; 336/90; 336/200; 336/223; 336/232; 252/62.59

(58) Field of Classification Search ................ 336/90, 336/200, 223, 232, 233; 252/62.59
See application file for complete search history.

(56) References Cited

U.S. PATENT DOCUMENTS

| | | | |
|---|---|---|---|
| 5,323,282 A * | 6/1994 | Kanai et al. ............... 360/235.3 |
| 5,906,768 A * | 5/1999 | Kakinuma et al. ......... 252/62.62 |
| 2003/0059365 A1 * | 3/2003 | Ito et al. ..................... 423/594 |
| 2004/0100347 A1 * | 5/2004 | Okamoto .................... 336/83 |
| 2004/0140877 A1 * | 7/2004 | Nakao et al. ................ 336/200 |
| 2005/0062576 A1 * | 3/2005 | Asakura et al. .............. 336/233 |
| 2005/0258393 A1 * | 11/2005 | Takane et al. ................ 252/62.6 |

FOREIGN PATENT DOCUMENTS

| | | |
|---|---|---|
| JP | 05-326243 A | 12/1993 |
| JP | 06-120021 A | 4/1994 |
| JP | 08-236337 A | 9/1996 |
| JP | 2002-124408 A | 4/2002 |
| JP | 2002-246221 A | 8/2002 |
| JP | 2002-255637 A | 9/2002 |
| JP | 2006-219306 A | 8/2006 |
| JP | 2006-273608 A | 10/2006 |
| WO | WO 2005122192 A1 * | 12/2005 |

* cited by examiner

Primary Examiner — Elvin G Enad
Assistant Examiner — Tsz Chan
(74) Attorney, Agent, or Firm — Sughrue Mion, PLLC

(57) ABSTRACT

A low-loss ferrite comprising as main components 46.5-49.5% by mol of $Fe_2O_3$, 17-26% by mol of ZnO, 4-12% by mol of CuO, and 0.2% or more and less than 1.2% by mol of CoO, the balance being NiO, and 0.03-1.4% by mass (as $SnO_2$) of Sn based on 100% by mass of the main components, and having an average crystal grain size of 0.7-2.5 μm, and an electronic device obtained by integrally sintering pluralities of layers of this low-loss ferrite and coil-shaped electrodes formed in the laminate.

12 Claims, 9 Drawing Sheets

LOW-LOSS FERRITE AND ELECTRONIC DEVICE FORMED BY SUCH FERRITE

CROSS REFERENCE TO RELATED APPLICATIONS

This application is a National Stage of International Application No. PCT/JP2008/057455 filed Apr. 16, 2008, claiming priority based on Japanese Patent Application No. 2007-108376 filed Apr. 17, 2007, the contents of all of which are incorporated herein by reference in their entirety.

FIELD OF THE INVENTION

The present invention relates to low-temperature-sinterable ferrite having low loss in a high frequency band with little variation of characteristics under stress, and an electronic device formed as an inductor by such ferrite.

BACKGROUND OF THE INVENTION

Various mobile electronic gears (cell phones, mobile information terminals PDA, note-type personal computers, DVD players, CD players, MD players, digital cameras, digital video cameras, etc.) comprise pluralities of DC/DC converters as power conversion apparatuses for converting the voltage of contained cells to operation voltage. In note-type personal computers, for instance, DC/DC converters are arranged near digital signal processors (DSP), micro processing units (MPU), etc.

As one example of DC/DC converters, FIG. 16 shows a step-down DC-DC converter comprising as discrete circuits an input capacitor Cin, an output capacitor Cout, an output inductor Lout, and a semiconductor-integrated circuit IC including a switching device and a control circuit on a printed circuit board. By operating the switching device based on a control signal from the control circuit, output voltage Vout expressed by Vout=Ton/(Ton+Toff)×Vin, wherein Ton is a time period in which the switching device is turned on, and Toff is a time period in which the switching device is turned off, is obtained from DC input voltage Vin. Even with the variation of the input voltage Vin, stable output voltage Vout can be obtained by adjusting a Ton/Toff ratio. An LC circuit comprising an output inductor Lout storing and discharging current energy, and an output capacitor Cout storing and discharging voltage energy acts as a filter circuit (smoothing circuit) for outputting DC voltage.

An output inductor Lout widely used at present, as shown in FIGS. 18 and 19, comprises a conductor wire 230 wound around a magnetic core 220. Used for the magnetic core 220 is high-resistance ferrite such as Ni—Zn ferrite, Ni—Cu—Zn ferrite, etc., so that a conductor wire can be wound directly around it.

The operation voltage of LSI (large scale integration) constituting DSP and MPU has been decreasing to 2.5 V, and further to 1.8 V, to expand the usable time period of cells. Because of such decrease of operation voltage, the voltage margin of LSI is reduced relative to the variation (ripple) of the output voltage of DC/DC converters, so that LSI is more influenced by noise. The switching frequencies of DC/DC converters have been increased from conventional 500 kHz to 1 MHz or more to suppress ripple, resulting in designing IC operable at 5-20 MHz.

Higher switching frequencies reduce inductance required for an output inductor Lout, enabling the size reduction of the inductor and a power supply circuit. However, higher switching frequencies contribute to the reduction of conversion efficiency due to loss generated in switching devices and inductors. Although power loss by inductors is caused predominantly by the DC resistance of conductor lines and output current at low frequencies, AC resistance (AC resistance of conductor lines and core loss of ferrite) is not negligible at high frequencies.

Accordingly, to operate DC/DC converters efficiently at high frequencies exceeding 5 MHz, particularly at about 10 MHz, it is important to reduce the core loss of ferrite constituting inductors. The core loss of ferrite is determined by hysteresis loss, eddy current loss and residual loss. It is known that these losses depend on the magnetic properties (coercivity, saturation magnetization, magnetic domain wall resonance, etc.), crystal grain size, resistivity, etc. of ferrite.

Inductors are also required to have stability under stress (little variation of inductance and less increase in loss under stress). Stress is caused by the difference in a linear thermal expansion coefficient between an inductor and a printed circuit board, the deformation of a printed circuit board, the curing of a molding resin when an inductor is sealed with a resin, shrinkage difference when internal conductors and ferrite are simultaneously sintered to produce a laminated inductor, the plating of external terminals, etc. Also, because DC/DC converters are exposed to heat generated by semiconductor-integrated circuits IC, etc., inductors used therein are required to exhibit stable characteristics at use temperatures; little variation of inductance with temperature.

As ferrite having improved stability under stress and temperature characteristics, JP 05-326243 A discloses Ni—Cu—Zn ferrite comprising 100% by mass of main components comprising 46.5-49.5% by mol of $Fe_2O_3$, 5.0-12.0% by mol of CuO, and 2.0-30.0% by mol of ZnO, the balance being NiO, and sub-components comprising 0.05-0.6% by mass of $Co_3O_4$, 0.5-2% by mass of $Bi_2O_3$, and 0.1-2% by mass in total of $SiO_2$ and $SnO_2$. However, this Ni—Cu—Zn ferrite contains as a sintering aid $Bi_2O_3$ having a melting point of 820° C. in a large amount of 0.5-2% by mass, though it contains $SnO_2$ and $Co_3O_4$. Accordingly, it has an average crystal grain size of 3 μm or more, and large core loss and relative temperature coefficient $\alpha\mu_r$ at high frequencies.

JP 2002-255637 A discloses a magnetic oxide ceramic composition comprising 100 parts by weight of main components comprising 45.0-49.5% by mol of $Fe_2O_3$, 1.0-30.0% by mol of ZnO, and 8.0-12.0% by mol of CuO, the balance being NiO, and 1.5-3.0 parts by weight (as $SnO_2$) of Sn oxide, 0.02-0.20 parts by weight (as $Co_3O_4$) of Co oxide, and 0.45 parts or less by weight (as $Bi_2O_3$) of Bi oxide. However, it suffers as large a relative temperature coefficient of initial permeability as ±500 ppm/° C. between −25° C. and +85° C., and large core loss at high frequencies because of as much Sn oxide as 1.5 parts or more by weight as $SnO_2$.

OBJECT OF THE INVENTION

Accordingly, an object of the present invention is to provide ferrite sinterable at lower temperatures than the melting point of Ag, having low loss at as high a frequency as 10 MHz, and suffering little variation of characteristics under stress, and an electronic device using this ferrite.

DISCLOSURE OF THE INVENTION

The low-loss ferrite of the present invention comprises as main components 46.5-49.5% by mol of $Fe_2O_3$, 17-26% by mol of ZnO, 4-12% by mol of CuO, and 0.2% or more and less than 1.2% by mol of CoO, the balance being NiO, and 0.03-

1.4% by mass (as $SnO_2$) of Sn based on 100% by mass of the main components, and has an average crystal grain size of 0.7-2.5 μm.

The low-loss ferrite of the present invention preferably further comprises 0.2% or less by mass (as $V_2O_5$) of V and/or 1% or less by mass (as $Mn_3O_4$) of Mn, based on 100% by mass of the main components. The V content is more preferably less than 0.1% by mass as $V_2O_5$.

The low-loss ferrite of the present invention has core loss of 5000 kW/m³ or less at a frequency of 10 MHz and an operating magnetic flux density Bm of 20 mT. The low-loss ferrite of the present invention also has a saturation magnetic flux density of 290 mT or more in a magnetic field of 4000 A/m at 120° C.

In the low-loss ferrite of the present invention, both of a relative temperature coefficient $\alpha\mu_{ir1}$ of initial permeability $\mu_{i1}$ between −40° C. and +20° C., and a relative temperature coefficient $\alpha\mu_{ir2}$ of initial permeability $\alpha\mu_{i2}$ between +20° C. and +80° C. are preferably positive values of +35 ppm or less.

The electronic device of the present invention comprises a magnetic core formed by the above low-loss ferrite and a coil wound around the magnetic core.

The electronic device according to one embodiment of the present invention is obtained by integrally sintering a laminate having pluralities of layers formed by the above low-loss ferrite, and a coil-shaped electrode formed in the laminate.

The electronic device according to another embodiment of the present invention is obtained by integrally sintering a laminate having pluralities of layers of low-loss ferrite and at least one non-magnetic layer of Zn ferrite having a Curie temperature of −50° C. or lower, and a coil-shaped electrode formed in the laminate; the low-loss ferrite comprising $Fe_2O_3$, ZnO, CuO, CoO and NiO as main components, and SnO as a sub-component, and having a relative temperature coefficient $\alpha\mu_{ir1}$ of initial permeability $\alpha\mu_{i1}$ between −40° C. and +20° C. and a relative temperature coefficient $\alpha\mu_{ir2}$ of initial permeability $\mu_{i2}$ between +20° C. and +80° C., both of which are +10 ppm to +35 ppm; and the non-magnetic layer functioning as a magnetic gap. In this electronic device, the low-loss ferrite preferably has core loss of 5000 kW/m³ or less at a frequency of 10 MHz and an operating magnetic flux density Bm of 20 mT.

In the electronic device of the present invention, semiconductor devices including a switch device preferably are mounted onto surface electrodes of the laminate.

BRIEF DESCRIPTION OF THE DRAWINGS

FIG. 1(*b*) is an exploded cross-sectional view showing a composite sheet constituting the laminated inductor of FIG. 1(*a*).

FIG. 1(*c*) is a cross-sectional view showing the internal structure of the laminated inductor of FIG. 1(*a*).

FIG. 1(*d*) is a cross-sectional view taken along the line A-A in FIG. 1(*c*).

DESCRIPTION OF THE PREFERRED EMBODIMENTS

Figure 1A:
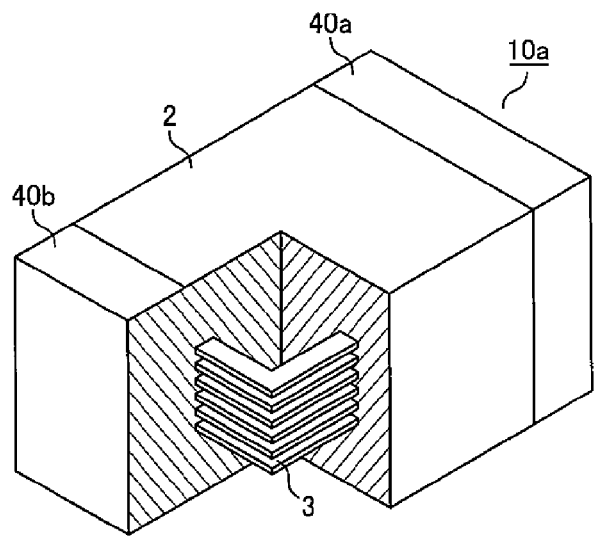
FIG. 1(*a*) is a perspective view showing the appearance of a laminated inductor formed by the low-loss ferrite of the present invention.

[1] Low-Loss Ferrite (A) Composition (1) Main Components

The low-loss ferrite (Ni—Cu—Zn ferrite) of the present invention comprises as main components 46.5-49.5% by mol of $Fe_2O_3$, 17-26% by mol of ZnO, 4-12% by mol of CuO, and 0.2% or more and less than 1.2% by mol of CoO, the balance being NiO.

When $Fe_2O_3$ is less than 46.5% by mol, the ferrite has large core loss Pcv, and does not have sufficient permeability. When $Fe_2O_3$ is more than 49.5% by mol, the ferrite is not sufficiently sintered at a temperature equal to or lower than 960° C., the melting point of Ag, and has poor magnetic properties and low mechanical strength. $Fe_2O_3$ is preferably 47-49% by mol.

When ZnO is less than 17% by mol, the ferrite has a large relative temperature coefficient $\alpha\mu_{ir}$ of initial permeability $\mu_i$, and low permeability. On the other hand, when ZnO is more than 26% by mol, the ferrite has large core loss Pcv. The preferred ZnO content is 17-23% by mol.

When CuO is less than 4% by mol, the sinterability is low, resulting in ferrite with low permeability and large core loss Pcv. On the other hand, when CuO exceeds 12% by mol, the ferrite has drastically increased core loss. The preferred CuO content is 4.5-10% by mol.

CoO is a component contributing to the reduction of core loss at high frequencies. Accordingly, when CoO is less than 0.2% by mol, the ferrite has large core loss Pcv. On the other hand, when CoO is 1.2% or more by mol, the ferrite has a large relative temperature coefficient $\alpha\mu_{ir}$. $Co^{2+}$ has a positive crystal magnetic anisotropy constant, while Ni—Zn ferrite has a negative magnetic anisotropy constant. Accordingly, the solid solution of Co in Ni—Zn ferrite reduces the magnetic anisotropy constant, and thus reduces core loss at high frequencies. However, when the amount of CoO is 1.2% or more by mol, the relative temperature coefficient $\alpha\mu_{ir}$ of initial permeability $\mu_i$ in a range from $-40°$ C. to $+80°$ C. is larger than +35 ppm/° C. When the relative temperature coefficient $\alpha\mu_{ir}$ exceeds +35 ppm/° C., the ferrite provides electronic devices such as inductors with too large temperature variation of inductance. The preferred CoO content is 0.25-1.1% by mol.

NiO is a balance in the main components. To obtain the desired permeability, and to prevent the saturation magnetic flux density Bs from decreasing at 120° C., a molar ratio of NiO/CuO is preferably 0.8-4.5.

(2) Sub-Components

The low-loss ferrite of the present invention comprises 0.03-1.4% by mass (as $SnO_2$) of Sn as a sub-component, per 100% by mass of the main components. For loss reduction, the low-loss ferrite may contain less than 0.2% or less by mass (as $V_2O_5$) of V, and/or 1% or less by mass (as $Mn_3O_4$) of Mn as the other sub-components.

The addition of Sn provides the ferrite with decreased saturation magnetic flux density Bs and increased coercivity Hc. Sn is dissolved in crystal grains as stable tetravalent ions to reduce lattice strain, thereby reducing a saturation magnetostriction constant $\lambda s$ and a magnetic anisotropy constant $K_1$, and thus suppressing inductance change and core loss increase due to stress. As the temperature elevates, the saturation magnetic flux density Bs and the magnetic anisotropy constant $K_1$ decrease, but the addition of 1.4% or less by mass (as $SnO_2$) of Sn makes it possible to adjust the magnetic anisotropy constant $K_1$, thereby reducing the core loss and the relative temperature coefficient $\alpha\mu_{ir}$. When $SnO_2$ is more than 1.4% by mass, the ferrite has increased core loss. More $SnO_2$ hinders sintering. When $SnO_2$ is less than 0.03% by mass, sufficient effect of adding $SnO_2$ cannot be obtained. The preferred amount of Sn is 0.25-1.2% by mass as $SnO_2$.

The low-loss ferrite of the present invention preferably contains 0.2% or less by mass (as $V_2O_5$) of V. V enters crystal boundaries to reduce the relative temperature coefficient $\alpha\mu_{ir}$ of initial permeability $\mu_i$. If V is less than 0.1% by mass (as $V_2O_5$), it also has an effect of reducing core loss. Because V is a low-melting-point metal for accelerating sintering, the addition of V in an amount of 0.1% or more by mass increases the core loss Pcv. Accordingly, the amount of $V_2O_5$ is preferably 0.08% or less by mass.

The low-loss ferrite of the present invention preferably further contains 1% or less by mass (as $Mn_3O_4$) of Mn. The addition of Mn reduces lattice strain, increases initial permeability $\mu_i$, improves the linearity of a B—H loop, lowers coercivity Hc in a minor loop, and reduces hysteresis loss. At 10 MHz, however, the stress characteristics of inductance tends to deteriorate, despite a small percentage of hysteresis loss in the core loss. Accordingly, the amount of $Mn_3O_4$ added is preferably 1% or less by mass to improve the initial permeability $\mu_i$, while reducing its relative temperature coefficient $\alpha\mu_{ir}$.

(3) Other Components

The low-loss ferrite of the present invention may further contain 1.5% by mass or less (as CaO) of Ca, and 1.5% by mass or less (as $SiO_2$) of Si. They suppress the growth of crystal grains, resulting in decreased permeability and increased resistivity. A small amount of Bi may be added to alleviate the reduction of sinterability by the addition of Sn, but the addition of more than 0.3% by mass (as $Bi_2O_3$) of Bi undesirably increases the average crystal grain size to more than 2.5 µm.

The amounts of inevitable impurities such as Na, S, Cl, P, W, B, etc. are preferably as small as possible, and their industrially permitted ranges are 0.05% or less by mass in total. Particularly less than 5 ppm of Cl and less than 8 ppm of P are advantageous for low loss.

The amounts of the main components and the sub-components are determined by fluorescent X-ray analysis and ICP atomic emission spectroscopy. Elements contained are first qualitatively analyzed by fluorescent X-ray, and then quantitatively analyzed by a calibration method comparing with a standard sample.

(B) Structure and Properties

The low-loss ferrite of the present invention has an average crystal grain size of 0.7-2.5 µm. The average crystal grain size of 2.5 µm or less reduces eddy current loss, residual loss because of decrease in magnetic domain walls, and core loss at high frequencies of 5 MHz. However, when the average crystal grain size is less than 0.7 µm, crystal grain boundaries act as pinning points of magnetic domain walls, making it likely to decrease the permeability and increase the core loss. When the average crystal grain size is more than 2.5 µm, the eddy current loss and the residual loss have large influence, resulting in remarkable increase in loss at high frequencies (10 MHz).

To obtain the average crystal grain size of 2.5 µm or less, the calcined ferrite powder to be sintered preferably has a BET specific surface area of 6-10 $m^2$/g. Because a larger BET specific surface area provides larger reactivity, densification is accelerated from low sintering temperatures. When the BET specific surface area of the calcined ferrite powder is 6-10 $m^2$/g, dense ferrite having a small and uniform crystal grain size is obtained even at as low sintering temperatures as 960° C. or lower.

When the BET specific surface area of the calcined ferrite powder is less than 6 $m^2$/g, the sintered ferrite may have an average crystal grain size of more than 3 µm. When the BET specific surface area is more than 10 $m^2$/g, the calcined ferrite powder easily aggregates and adsorbs water, so that calcined ferrite powder slurry containing a water-soluble resin such as polyvinyl butyral as a binder easily has an aggregated structure, providing green sheets with a lot of pores. Accordingly, the preferred BET specific surface area of the calcined ferrite powder is 6-8 $m^2$/g.

The initial permeability $\mu_i$ of ferrite is parallel to $Bs^2/(aK_1 + b\lambda s\sigma)$, wherein Bs represents a saturation magnetic flux density, $K_1$ represents a magnetic anisotropy constant, $\lambda s$ represents a magnetostriction constant, $\sigma$ represents stress, and a and b represent constants. Because Ni—Cu—Zn ferrite usually has a negative magnetostriction constant, the initial permeability $\mu_i$ increases to the maximum and then decreases with compression stress. However, because the low-loss ferrite of the present invention contains Co, the initial permeability $\mu_i$ gradually decreases with compression stress. This tendency is improved by the addition of Sn.

The initial permeability $\mu_i$ necessary for the ferrite is properly determined depending on conditions such as the frequencies used, magnetic gaps when used for inductors. Because an inductor having a magnetic gap in a magnetic circuit to improve DC superposition characteristics has reduced effective permeability, its initial permeability $\mu_i$ is preferably 70 or more.

[2] Electronic Device

FIGS. 1(a)-1(d) show a laminated inductor 10a containing a coil, as an electronic device using the low-loss ferrite of the present invention. Green sheets of low-loss ferrite are formed by a doctor blade method, etc., and a coil-shaped conductor pattern 30 is formed on each sheet with a conductor paste of Ag or its alloy, etc. A ferrite paste 22 and/or a non-magnetic paste 23 are then printed, if necessary. The green sheets are laminated and integrally sintered to form a laminate 2, in which the coil-shaped conductor patterns 30 are connected to form a coil 3. External terminals 40a, 40b are formed on the side surfaces of the laminate on which lead wires connected to both ends of coil 3 are exposed, thereby forming a laminated inductor 10a. The laminate need only have at least one layer formed by the non-magnetic paste 23.

In an electronic device having a magnetic gap, the magnetic gap is preferably formed by Zn ferrite (non-magnetic ferrite) having a Curie temperature Tc of −50° C. or lower. Sintering causes the mutual diffusion of elements in boundaries between layers of the Ni—Cu—Zn ferrite of the present invention and Zn ferrite layers. Particularly because the Zn ferrite layer contains a relatively large amount of Zn, Zn diffuses into the Ni—Cu—Zn ferrite layer, resulting in decrease in the Zn content in the Zn ferrite layer. EPMA (electron probe microanalysis) of layer boundaries reveals the formation of boundary layers in which the Zn content changes continuously. Because the Curie temperature Tc of the boundary layer continuously changes with the Zn content, there is a phenomenon as if a magnetic gap formed in the electronic device is expanded as the temperature elevates. As a result, influence by the relative temperature coefficient $\alpha\mu_{ir}$ of initial permeability $\mu_i$ decreases, resulting in smaller change of inductance by the temperature. Boundary layers are preferably as thick as about 5-50 μm. The thickness of the boundary layers is adjusted depending on the sintering temperature and its profile, the number of magnetic gaps, etc.

Figure 2:
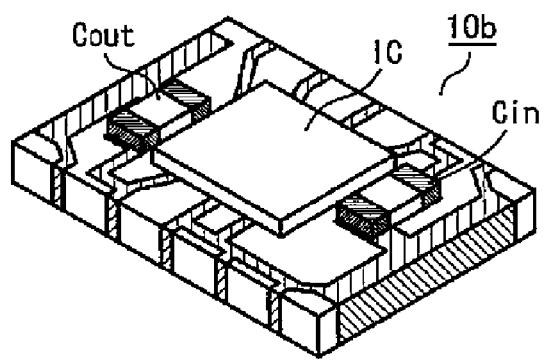
FIG. 2 is a perspective view showing the appearance of a DC/DC converter using the low-loss ferrite of the present invention.
Figure 3:
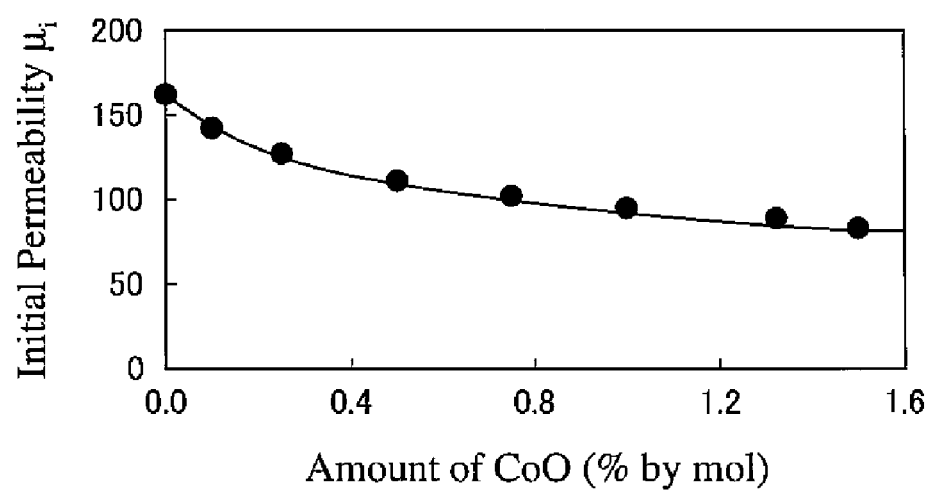
FIG. 3 is a graph showing the relation between the amount of CoO and initial permeability $\mu_i$.
Figure 4:
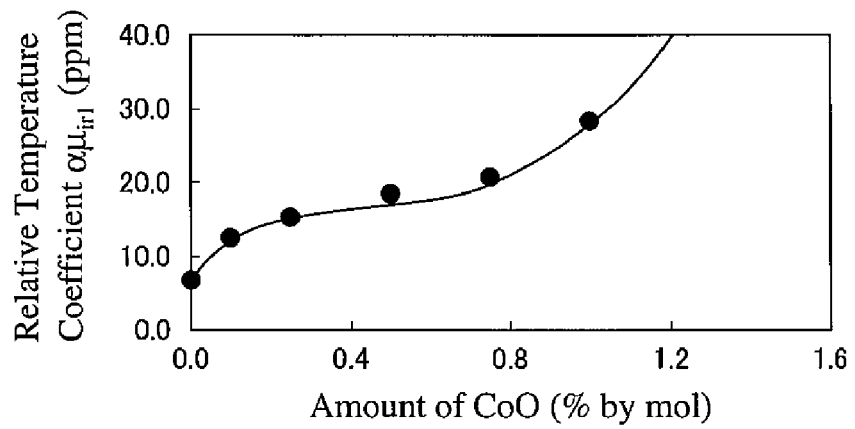
FIG. 4 is a graph showing the relation between the amount of CoO and a relative temperature coefficient $\alpha\mu_{ir1}$ of initial permeability
Figure 5:
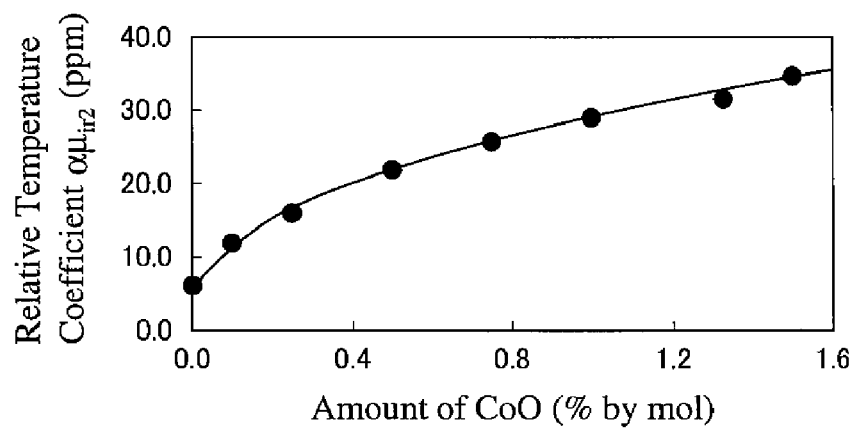
FIG. 5 is a graph showing the relation between the amount of CoO and a relative temperature coefficient $\alpha\mu_{ir2}$ of initial permeability $\mu_{i2}$.
Figure 6:
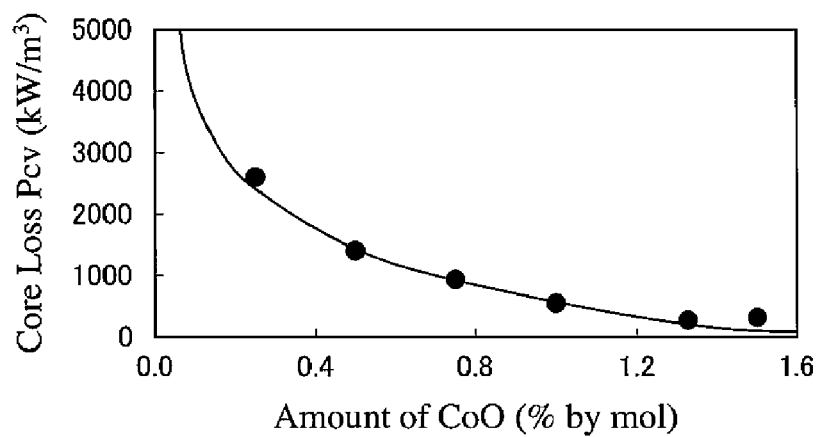
FIG. 6 is a graph showing the relation between the amount of CoO and core loss Pcv.
Figure 7:
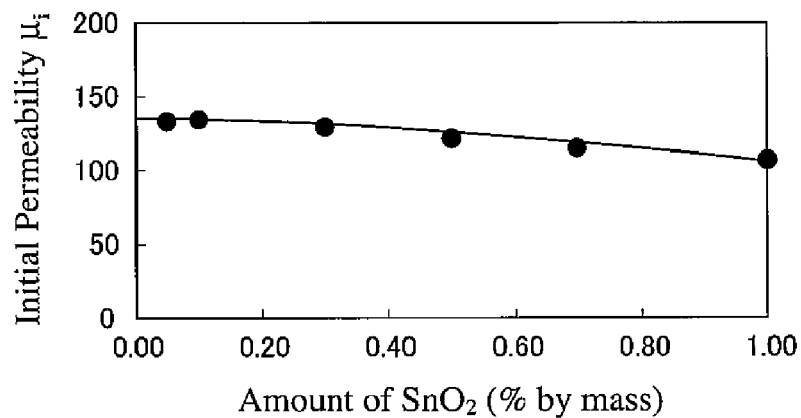
FIG. 7 is a graph showing the relation between the amount of $SnO_2$ and initial permeability $\mu_i$.
Figure 8:
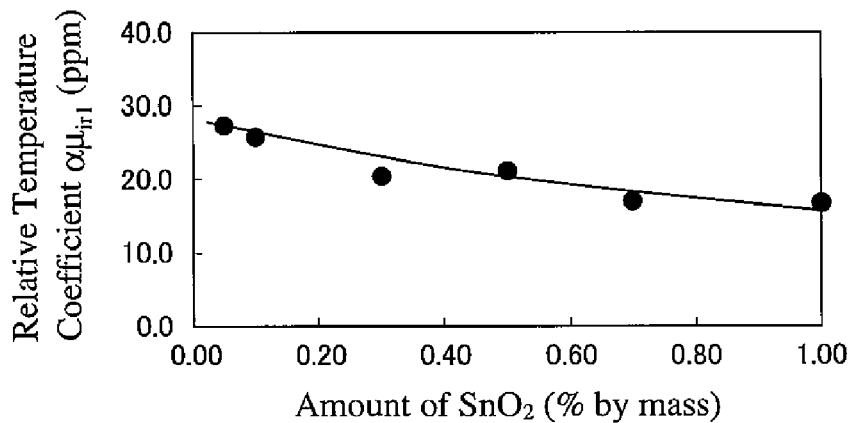
FIG. 8 is a graph showing the relation between the amount of $SnO_2$ and a relative temperature coefficient $\alpha\mu_{ir1}$ of initial permeability $\mu_{i1}$.
Figure 9:
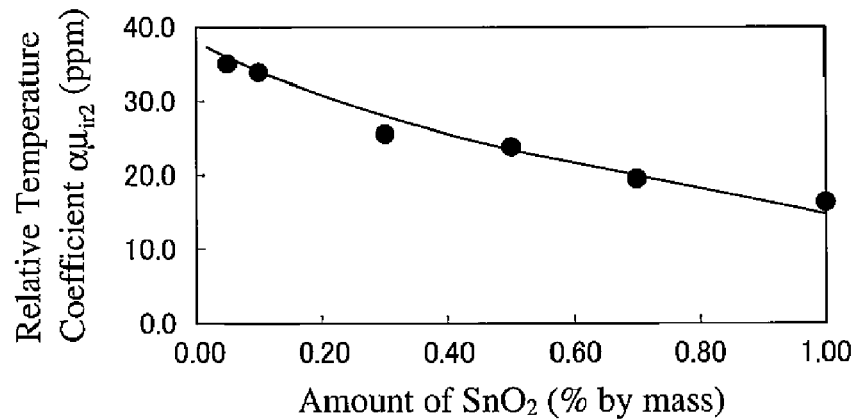
FIG. 9 is a graph showing the relation between the amount of $SnO_2$ and a relative temperature coefficient $\alpha\mu_{ir2}$ of initial permeability $\mu_{i2}$.
Figure 10:
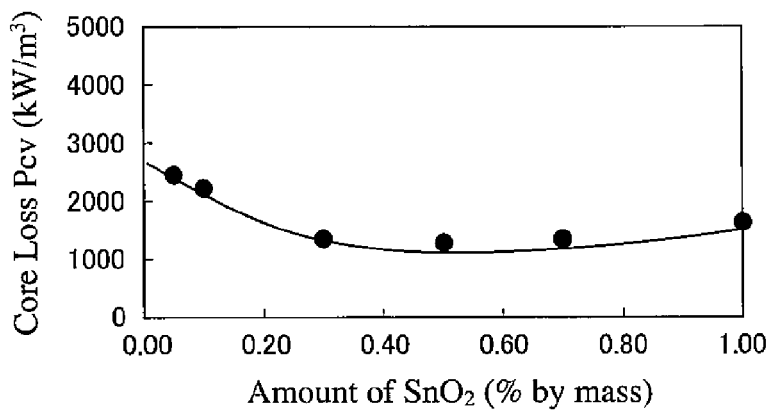
FIG. 10 is a graph showing the relation between the amount of $SnO_2$ and core loss Pcv.

As another example of the electronic devices, FIG. 2 shows a DC/DC converter module comprising a semiconductor-integrated circuit part IC and capacitors Cin, Cout mounted on the surface electrodes of an inductor-containing laminate substrate 10b to have electric connection to the inductor. Alternatively, an inductor and a semiconductor-integrated circuit part IC may be mounted on a capacitors-containing laminate substrate to constitute a module.

The present invention will be explained in further detail by Examples below without intention of restricting the present invention thereto.

Example 1

The main components of $Fe_2O_3$, ZnO, CuO and NiO, and the sub-components of $SnO_2$, $V_2O_5$, $Mn_3O_4$ and $Bi_2O_3$ were wet-mixed at the proportions shown in Table 1, dried, and then calcined at 800° C. for 2 hours. The calcined powder was charged into a ball mill together with ion-exchanged water, and pulverized for about 20 hours until its BET specific surface area became 6.5 m$^2$/g. Each calcined powder was mixed with polyvinyl alcohol, granulated by a spray-drying method, molded, and sintered at a temperature of 900° C. for 2 hours in the air, to obtain a ring-shaped sample of 8 mm in outer diameter, 4 mm in inner diameter and 2 mm in thickness, and a rectangular annular sample of 8 mm×8 mm in outer size, 4 mm×4 mm in inner size, and 2 mm in thickness.

TABLE 1

| Sample | Main components (% by mol) | | | | | Sub-components (% by mass) | | | |
|---|---|---|---|---|---|---|---|---|---|
| | $Fe_2O_3$ | ZnO | NiO | CuO | CoO | $SnO_2$ | $Mn_3O_4$ | $V_2O_5$ | $Bi_2O_5$ |
| 1* | 48.5 | 25.0 | 17.7 | 8.8 | 0 | 0 | 0 | 0 | 0 |
| 2 | 46.5 | 25.0 | 18.7 | 8.8 | 1.0 | 0.5 | 0 | 0 | 0 |
| 3 | 47.0 | 25.0 | 18.2 | 8.8 | 1.0 | 0.5 | 0 | 0 | 0 |
| 4 | 47.5 | 25.0 | 17.7 | 8.8 | 1.0 | 0.5 | 0 | 0 | 0 |
| 5 | 48.0 | 25.0 | 17.2 | 8.8 | 1.0 | 0.5 | 0 | 0 | 0 |
| 6 | 48.5 | 25.0 | 16.7 | 8.8 | 1.0 | 0.5 | 0 | 0 | 0 |
| 7 | 49.0 | 25.0 | 16.2 | 8.8 | 1.0 | 0.5 | 0 | 0 | 0 |
| 8 | 49.5 | 25.0 | 15.7 | 8.8 | 1.0 | 0.5 | 0 | 0 | 0 |
| 9* | 50.0 | 25.0 | 15.2 | 8.8 | 1.0 | 0.5 | 0 | 0 | 0 |
| 10* | 48.5 | 15.0 | 26.7 | 8.8 | 1.0 | 0.5 | 0 | 0 | 0 |
| 11 | 48.5 | 17.0 | 24.7 | 8.8 | 1.0 | 0.5 | 0 | 0 | 0 |
| 12 | 48.5 | 19.0 | 22.7 | 8.8 | 1.0 | 0.5 | 0 | 0 | 0 |
| 13 | 48.5 | 21.0 | 20.7 | 8.8 | 1.0 | 0.5 | 0 | 0 | 0 |
| 14 | 48.5 | 23.0 | 18.7 | 8.8 | 1.0 | 0.5 | 0 | 0 | 0 |
| 15 | 48.5 | 26.0 | 15.7 | 8.8 | 1.0 | 0.5 | 0 | 0 | 0 |
| 16* | 48.5 | 27.0 | 14.7 | 8.8 | 1.0 | 0.5 | 0 | 0 | 0 |
| 17 | 48.5 | 25.0 | 20.7 | 4.8 | 1.0 | 0.5 | 0 | 0 | 0 |
| 18 | 48.5 | 25.0 | 18.7 | 6.8 | 1.0 | 0.5 | 0 | 0 | 0 |
| 19 | 48.5 | 25.0 | 14.7 | 10.8 | 1.0 | 0.5 | 0 | 0 | 0 |
| 20* | 48.5 | 25.0 | 12.7 | 12.8 | 1.0 | 0.5 | 0 | 0 | 0 |
| 21* | 48.5 | 25.0 | 10.7 | 14.8 | 1.0 | 0.5 | 0 | 0 | 0 |
| 22 | 48.5 | 25.0 | 16.7 | 8.8 | 1.0 | 1.0 | 0 | 0 | 0 |
| 23* | 48.5 | 25.0 | 16.7 | 8.8 | 1.0 | 3.0 | 0 | 0 | 0 |
| 24* | 48.5 | 25.0 | 15.7 | 8.8 | 2.0 | 0.0 | 0 | 0 | 0 |
| 25* | 48.5 | 25.0 | 17.7 | 8.8 | 0.0 | 0.5 | 0 | 0 | 0 |
| 27* | 48.5 | 20.0 | 22.7 | 8.8 | 0.0 | 0.5 | 0 | 0 | 0 |
| 28* | 48.5 | 20.0 | 22.6 | 8.8 | 0.1 | 0.5 | 0 | 0 | 0 |
| 29 | 48.5 | 20.0 | 22.5 | 8.8 | 0.25 | 0.5 | 0 | 0 | 0 |
| 30 | 48.5 | 20.0 | 22.2 | 8.8 | 0.5 | 0.5 | 0 | 0 | 0 |
| 31 | 48.5 | 20.0 | 22.0 | 8.8 | 0.75 | 0.5 | 0 | 0 | 0 |
| 32 | 48.5 | 20.0 | 21.7 | 8.8 | 1.0 | 0.5 | 0 | 0 | 0 |

TABLE 1-continued

| | Main components (% by mol) | | | | | Sub-components (% by mass) | | | |
|---|---|---|---|---|---|---|---|---|---|
| Sample | $Fe_2O_3$ | ZnO | NiO | CuO | CoO | $SnO_2$ | $Mn_3O_4$ | $V_2O_5$ | $Bi_2O_5$ |
| 33 | 48.5 | 20.0 | 21.6 | 8.8 | 1.1 | 0.5 | 0 | 0 | 0 |
| 34* | 48.5 | 20.0 | 21.5 | 8.8 | 1.2 | 0.5 | 0 | 0 | 0 |
| 35* | 48.5 | 20.0 | 21.5 | 8.8 | 1.25 | 0.5 | 0 | 0 | 0 |
| 36* | 48.5 | 20.0 | 21.2 | 8.8 | 1.5 | 0.5 | 0 | 0 | 0 |
| 37 | 48.5 | 20.0 | 22.2 | 8.8 | 0.5 | 0.05 | 0 | 0 | 0 |
| 38 | 48.5 | 20.0 | 22.2 | 8.8 | 0.5 | 0.1 | 0 | 0 | 0 |
| 39 | 48.5 | 20.0 | 22.2 | 8.8 | 0.5 | 0.3 | 0 | 0 | 0 |
| 40 | 48.5 | 20.0 | 22.2 | 8.8 | 0.5 | 0.5 | 0 | 0 | 0 |
| 41 | 48.5 | 20.0 | 22.2 | 8.8 | 0.5 | 0.7 | 0 | 0 | 0 |
| 42 | 48.5 | 20.0 | 22.2 | 8.8 | 0.5 | 1.0 | 0 | 0 | 0 |
| 43 | 48.5 | 20.0 | 22.2 | 8.8 | 0.5 | 0.5 | 0.1 | 0 | 0 |
| 44 | 48.5 | 20.0 | 22.2 | 8.8 | 0.5 | 0.5 | 0.3 | 0 | 0 |
| 45 | 48.5 | 20.0 | 22.2 | 8.8 | 0.5 | 0.5 | 0.5 | 0 | 0 |
| 46 | 48.5 | 20.0 | 22.2 | 8.8 | 0.5 | 0.5 | 0.8 | 0 | 0 |
| 47 | 48.5 | 20.0 | 22.2 | 8.8 | 0.5 | 0.5 | 1.0 | 0 | 0 |
| 48 | 48.5 | 20.0 | 22.2 | 8.8 | 0.5 | 0.5 | 0 | 0.03 | 0 |
| 49 | 48.5 | 20.0 | 22.2 | 8.8 | 0.5 | 0.5 | 0 | 0.05 | 0 |
| 50 | 48.5 | 20.0 | 22.2 | 8.8 | 0.5 | 0.5 | 0 | 0.08 | 0 |
| 51 | 48.5 | 20.0 | 22.2 | 8.8 | 0.5 | 0.5 | 0 | 0.10 | 0 |
| 52 | 48.5 | 20.0 | 22.2 | 8.8 | 0.5 | 0.5 | 0.5 | 0.05 | 0 |
| 53 | 48.5 | 20.0 | 22.2 | 8.8 | 0.5 | 0.5 | 0 | 0 | 0.2 |
| 54 | 48.5 | 20.0 | 22.2 | 8.8 | 0.5 | 0.5 | 0.5 | 0 | 0.2 |
| 55* | 48.5 | 20.0 | 22.2 | 8.8 | 0.5 | 0.5 | 0.5 | 0 | 0.5 |

Note:
Samples with * are outside the present invention (Comparative Examples).

The density, average crystal grain size, initial permeability $\mu_i$ and its relative temperature coefficient $\alpha\mu_{ir}$, saturation magnetic flux density Bs, residual magnetic flux density Br, coercivity Hc, and core loss Pcv of each sample were measured by the following methods. The measurement results are shown in Table 2.

(1) Density

The density was calculated from the size and weight of a ring-shaped sample.

(2) Average Crystal Grain Size

A straight line having an arbitrary length $L_1$ was drawn on an electron photomicrograph (magnification: 10,000 times) of an as-sintered surface (outer surface) of a ring-shaped sample to count the number $N_1$ of particles existing on this straight line, and the length $L_1$ was divided by the number $N_1$ of particles to calculate $L_1/N_1$. The values of $L_1/N_1$ obtained on pluralities of straight lines were averaged to determine the average crystal grain size.

(3) Initial Permeability $\mu_i$

A copper wire was wound around a ring-shaped sample by 7 turns to produce an inductor, whose inductance L was measured at +20° C. by an LCR meter at a frequency of 1 MHz and current of 1 mA, to calculate initial permeability $\mu_i$ by the following formula:

$$\mu_i = (le \times L)/(\mu_0 \times Ae \times N^2),$$

wherein le represents the length of a magnetic path, L represents inductance, $\mu_0$ represents the permeability of vacuum, which is $4\pi \times 10^{-7}$ (H/m), Ae represents the cross section area of a sample, and N represents the number of turns of a coil.

(4) Relative Temperature Coefficient $\alpha\mu_{ir}$ of Initial Permeability $\mu_i$ The relative temperature coefficient $\alpha\mu_{ir}$ of initial permeability $\mu_i$ is expressed by the following formula:

$$\alpha\mu_{ir} = [(\mu_{i2} - \mu_{i1})/\mu_{i1}^2]/(T_2 - T_1),$$

wherein $T_1$ and $T_2$ represent measurement temperatures, $\mu_{i1}$ represents initial permeability at the temperature $T_1$, and $\mu_{i2}$ represents initial permeability at the temperature $T_2$.

Initial permeability $\mu_i$ was measured with respect to each sample adjusted to −40° C. to +80° C. in an electronic constant-temperature chamber. In the case of a relative temperature coefficient $\alpha\mu_{ir1}$ from −40° C. to +20° C., $T_1$=+20° C., and $T_2$=−40° C., $\mu_{i1}$ represents initial permeability at +20° C., and $\mu_{i2}$ represents initial permeability at −40° C. In the case of a relative temperature coefficient $\alpha\mu_{ir2}$ from +20° C. to +80° C., $T_1$=+20° C., $T_2$=+80° C., $\mu_{i1}$ represents initial permeability at +20° C., and $\mu_{i2}$ represents initial permeability at +80° C.

(5) Saturation Magnetic Flux Density Bs

A major loop of the hysteresis of each ring-shaped sample was measured by a B—H analyzer in a magnetic field of 4000 A/m and a frequency of 10 kHz. The saturation magnetic flux density Bs was determined from this hysteresis loop at −20° C. and +120° C.

(6) Residual Magnetic Flux Density Br

The residual magnetic flux density Br was determined from the above hysteresis loop.

(7) Coercivity Hc

The coercivity Hc was determined from the above hysteresis loop.

(8) Core Loss Pcv

Copper wires were wound around a ring-shaped sample by 5 turns on both primary and secondary sides, to measure Pcv at 25° C. under the condition of 10 MHz and 20 mT.

TABLE 2

| Sample | Density (g/cm³) | Initial Permeability μ_i | αμ_ir (ppm/°C.) −40°C. to +20°C. | αμ_ir (ppm/°C.) +20°C. to +80°C. | Pcv (kW/m³) at 10 MHz and 20 mT |
|---|---|---|---|---|---|
| 1* | 5.26 | 404 | 7.9 | 7.8 | 15697 |
| 2 | 5.29 | 95 | 27.0 | 26.2 | 3034 |
| 3 | 5.29 | 115 | 23.7 | 26.0 | 1956 |
| 4 | 5.20 | 126 | 24.3 | 27.5 | 1759 |
| 5 | 5.30 | 141 | 23.1 | 26.1 | 2153 |
| 6 | 5.25 | 151 | 23.3 | 23.8 | 2457 |
| 7 | 5.23 | 160 | 24.3 | 23.0 | 2993 |
| 8 | 5.05 | 152 | 19.8 | 13.6 | 4260 |
| *9 | 4.25 | 46 | −18.5 | −23.5 | Immeasurable |
| *10 | 5.03 | 61 | 45.7 | 30.3 | 249 |
| 11 | 5.14 | 74 | 29.4 | 29.6 | 166 |
| 12 | 5.12 | 86 | 27.0 | 29.4 | 359 |
| 13 | 5.18 | 106 | 23.3 | 25.7 | 547 |
| 14 | 5.21 | 125 | 21.3 | 23.7 | 842 |
| 15 | 5.19 | 158 | 23.0 | 23.8 | 3751 |
| *16 | 5.14 | 165 | 21.8 | 23.0 | 4519 |
| 17 | 5.21 | 118 | 25.1 | 26.9 | 1207 |
| 18 | 5.23 | 136 | 22.0 | 25.5 | 1721 |
| 19 | 5.26 | 174 | 26.5 | 21.1 | 4850 |
| *20 | 5.25 | 194 | 30.1 | 18.8 | 8020 |
| *21 | 5.22 | 219 | 29.6 | 16.3 | 11079 |
| 22 | 5.24 | 148 | 21.2 | 18.7 | 2201 |
| *23 | 4.05 | 38 | −10.5 | −18.7 | Immeasurable |
| *24 | 5.23 | 126 | 70.3 | 40.8 | 1135 |
| *25 | 5.25 | 281 | 2.8 | 1.4 | 11793 |
| *27 | 5.14 | 162 | 6.7 | 6.3 | 6965 |
| *28 | 5.13 | 142 | 12.6 | 12.0 | 5085 |
| 29 | 5.16 | 127 | 15.4 | 16.0 | 2610 |
| 30 | 5.14 | 111 | 18.5 | 21.9 | 1412 |
| 31 | 5.15 | 102 | 20.7 | 25.7 | 933 |
| 32 | 5.20 | 104 | 28.6 | 27.7 | 543 |
| 33 | 5.20 | 100 | 32.6 | 29.9 | 522 |
| *34 | 5.22 | 96 | 41.7 | 29.4 | 413 |
| *35 | 5.15 | 89 | 47.1 | 31.4 | 275 |
| *36 | 5.13 | 83 | 66.3 | 34.5 | 312 |
| 37 | 5.21 | 132 | 27.4 | 34.7 | 2443 |
| 38 | 5.23 | 133 | 25.8 | 33.9 | 2228 |
| 39 | 5.22 | 128 | 20.5 | 25.5 | 1350 |
| 40 | 5.21 | 120 | 21.2 | 23.8 | 1278 |
| 41 | 5.23 | 114 | 17.0 | 19.4 | 1349 |
| 42 | 5.16 | 105 | 16.7 | 16.3 | 1631 |
| 43 | 5.21 | 123 | 19.5 | 23.1 | 1273 |
| 44 | 5.27 | 132 | 19.3 | 23.0 | 2047 |
| 45 | 5.25 | 135 | 19.0 | 23.1 | 2121 |
| 46 | 5.22 | 134 | 18.4 | 23.3 | 2121 |
| 47 | 5.23 | 134 | 17.9 | 24.2 | 2247 |
| 48 | 5.24 | 125 | 19.1 | 22.2 | 1228 |
| 49 | 5.22 | 122 | 19.9 | 23.4 | 1144 |
| 50 | 5.20 | 117 | 17.8 | 20.6 | 1122 |
| 51 | 5.14 | 108 | 16.8 | 17.4 | 1524 |
| 52 | 5.23 | 130 | 19.5 | 23.2 | 1837 |
| 53 | 5.20 | 116 | 17.7 | 19.3 | 1532 |
| 54 | 5.24 | 122 | 20.4 | 23.5 | 1644 |
| *55 | 4.95 | 111 | 24.0 | 36.0 | 16608 |

| Sample | Bs (mT) | Br (mT) | Hc (A/m) | Bs (mT) −20°C. | Bs (mT) +120°C. | Average Crystal Grain Size (μm) |
|---|---|---|---|---|---|---|
| 1* | 430 | 276 | 124 | 495 | 319 | 1.05 |
| 2 | 388 | 209 | 362 | 433 | 288 | 1.42 |
| 3 | 406 | 241 | 314 | 452 | 297 | 1.14 |
| 4 | 398 | 239 | 283 | —⁽¹⁾ | — | 1.17 |
| 5 | 415 | 255 | 266 | — | — | 1.33 |
| 6 | 417 | 262 | 251 | 474 | 309 | 1.33 |
| 7 | 419 | 262 | 237 | — | — | 1.10 |
| 8 | 390 | 263 | 293 | 447 | 292 | 0.86 |
| *9 | 259 | 174 | 793 | — | — | 0.36 |
| *10 | 388 | 267 | 559 | 415 | 327 | 0.96 |
| 11 | 406 | 279 | 485 | 436 | 337 | 0.83 |
| 12 | 411 | 280 | 424 | 445 | 335 | 0.83 |
| 13 | 422 | 281 | 357 | 461 | 335 | 1.09 |
| 14 | 420 | 274 | 312 | 464 | 325 | 1.22 |
| 15 | 405 | 247 | 233 | — | — | 1.33 |

TABLE 2-continued

| | | | | | | |
|---|---|---|---|---|---|---|
| *16 | 379 | 232 | 222 | 438 | 262 | 0.96 |
| 17 | 407 | 248 | 308 | 466 | 312 | 0.92 |
| 18 | 415 | 257 | 252 | — | — | 1.24 |
| 19 | 417 | 256 | 230 | 475 | 305 | 1.33 |
| *20 | 409 | 247 | 219 | — | — | 1.59 |
| *21 | 404 | 243 | 212 | 463 | 287 | 1.59 |
| 22 | 399 | 242 | 335 | 444 | 300 | 0.96 |
| *23 | 207 | 128 | 876 | — | — | <0.4 |
| *24 | 416 | 295 | 204 | 475 | 306 | 1.13 |
| *25 | 417 | 243 | 201 | 469 | 306 | 1.02 |
| *27 | 423 | 271 | 319 | 462 | 341 | 1.02 |
| *28 | 415 | 267 | 321 | 451 | 339 | 1.02 |
| 29 | 417 | 272 | 329 | 455 | 341 | 0.90 |
| 30 | 408 | 269 | 348 | 462 | 338 | 0.83 |
| 31 | 414 | 276 | 369 | 459 | 338 | 0.77 |
| 32 | 432 | 291 | 351 | 474 | 352 | 1.53 |
| 33 | 429 | 288 | 367 | 469 | 349 | 1.53 |
| *34 | 432 | 290 | 375 | 474 | 352 | 1.24 |
| *35 | 411 | 279 | 413 | 452 | 336 | 0.99 |
| *36 | 399 | 271 | 410 | 452 | 334 | 0.96 |
| 37 | 450 | 318 | 235 | 492 | 365 | 1.17 |
| 38 | 448 | 315 | 239 | 490 | 365 | 1.14 |
| 39 | 441 | 299 | 276 | —(1) | — | 1.14 |
| 40 | 432 | 281 | 322 | 473 | 352 | 1.33 |
| 41 | 427 | 273 | 362 | — | — | 1.28 |
| 42 | 414 | 257 | 411 | 456 | 338 | 1.10 |
| 43 | 433 | 285 | 320 | — | — | 1.14 |
| 44 | 442 | 294 | 297 | — | — | 1.42 |
| 45 | 442 | 298 | 288 | 479 | 358 | 1.47 |
| 46 | 440 | 304 | 283 | — | — | 1.33 |
| 47 | 440 | 318 | 302 | 486 | 356 | 1.37 |
| 48 | 437 | 283 | 312 | — | — | 1.37 |
| 49 | 442 | 286 | 323 | 478 | 353 | 1.33 |
| 50 | 427 | 271 | 332 | — | — | 1.37 |
| 51 | 414 | 263 | 374 | 455 | 338 | 0.92 |
| 52 | 437 | 286 | 290 | — | — | 1.59 |
| 53 | 436 | 255 | 318 | 471 | 352 | 1.89 |
| 54 | 437 | 271 | 306 | 471 | 356 | 1.53 |
| *55 | 419 | 238 | 150 | 457 | 336 | 15.15 |

Note:
Samples with * are outside the present invention (Comparative Examples).
(1)Not Measured.

In Samples 2-9, the $Fe_2O_3$ content was changed in balance with the NiO content. As $Fe_2O_3$ increased, the saturation magnetic flux density Bs increased, the coercivity Hc decreased, and the initial permeability $\mu_{ir}$ increased. The comparison of Samples 1-5 revealed that the smallest core loss Pcv was obtained when $Fe_2O_3$ was 47.5% by mol (Sample 4). When the $Fe_2O_3$ content exceeded 49.5% by mol (Sample 9), the sinterability, the saturation magnetic flux density Bs and the initial permeability $\mu_i$ decreased, and the coercivity Hc increased.

In Samples 10-16, the ZnO content was changed in balance with the NiO content. When the amount of ZnO substituting NiO increased, the saturation magnetic flux density Bs increased, the coercivity Hc decreased, and the initial permeability $\mu_i$ increased. When the ZnO content increased, the core loss Pcv increased. When the ZnO content exceeded 23.0% by mol, the core loss Pcv largely increased.

In Samples 17-21, the CuO content was changed in balance with the NiO content. A small amount of Cu substituting part of Ni provided a small crystal grain size, and thus reduced core loss Pcv, but it also reduced initial permeability $\mu_i$. In the compositions shown in Table 1, no decrease in the density was observed, ensuring sufficient sinterability. However, when CuO became 3.0% by mol, the sinterability decreased, failing to densify the ferrite, and resulting in extremely reduced initial permeability $\mu_i$ and saturation magnetic flux density Bs, and increased coercivity Hc and core loss Pcv.

FIGS. 3-6 respectively show the relations between the amount of CoO and the initial permeability $\mu_i$ and its relative temperature coefficients $\alpha\mu_{ir1}$, $\alpha\mu_{ir2}$ and the core loss Pcv in the ferrite of Samples 27-36. When the amount of CoO increased, the initial permeability $\mu_i$ decreased, but its relative temperature coefficient $\alpha\mu_{ir1}$, $\alpha\mu_{ir2}$ increased, and the core loss Pcv extremely decreased.

FIGS. 7-10 respectively show the relation between the amount of $SnO_2$ and initial permeability $\mu_i$ and its relative temperature coefficients $\alpha\mu_{ir1}$, $\alpha\mu_{ir2}$ and core loss Pcv in the ferrites of Samples 37-42. When the amount of $SnO_2$ increased, the initial permeability $\mu_i$ slightly decreased, and the relative temperature coefficients $\alpha\mu_{ir1}$, $\alpha\mu_{ir2}$ largely decreased. The core loss Pcv was smallest when the amount of $SnO_2$ was at a particular level (0.5% by mass).

Figure 11:
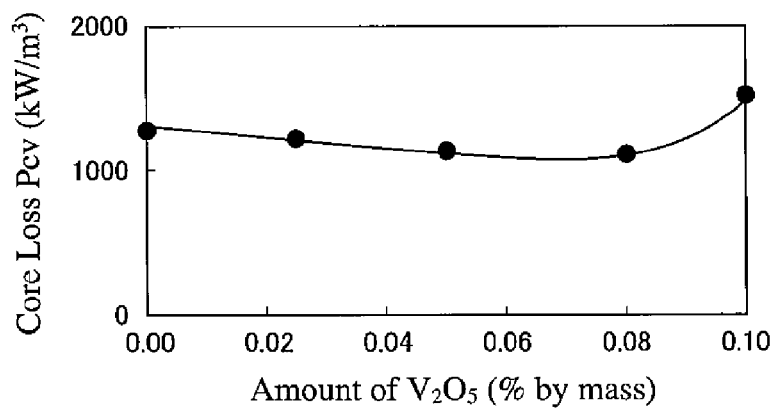
FIG. 11 is a graph showing the relation between the amount of $V_2O_5$ and core loss Pcv.

FIG. 11 shows the relation between the amount of $V_2O_5$ and core loss Pcv in the ferrites of Samples 48-51. It was found that the addition of $V_2O_5$ reduced the core loss Pcv by about 10%. Also, the addition of $Mn_3O_4$ increased the initial permeability $\mu_i$. Sample 55 containing 0.5% by mass of $Bi_2O_5$ had a structure containing crystal grains having an average crystal grain size of about 30 μm and crystal grains having an average crystal grain size of about 1 μm, exhibiting extremely high core loss Pcv.

A copper wire was wound by 12 turns around each of rectangular, annular Samples 1, 22, 38, 40, 42 and 50, and set in a pressing jig equipped with a tension meter. The inductance of Samples 1, 22, 38, 40 and 42 was continuously measured at room temperature, a frequency of 1 MHz and current of 1 mA, with and without a monoaxial compression force applied. The core loss Pcv of Samples 38, 40, 42 and 50 was continuously measured at room temperature, a frequency of 10 MHz and an operating magnetic flux density Bm of 20 mT, with and without a monoaxial compression force applied. The change ratios of inductance and core loss were calculated by the following formula.

(1) Change ratio $L_R$ of Inductance $$L_R=(L_1-L_0)/L_0\times100(\%),$$

$L_1$: Inductance when monoaxially compressed, and
$L_0$: Inductance without monoaxial compression.

(2) Change Ratio $C_R$ of Core Loss $$C_R=(Pcv_1-Pcv_0)/Pcv_0\times100(\%),$$

$Pcv_1$: Core loss at 10 MHz and 20 mT when monoaxially compressed, and
$Pcv_0$: Core loss at 10 MHz and 20 mT without monoaxial compression.

Figure 12:
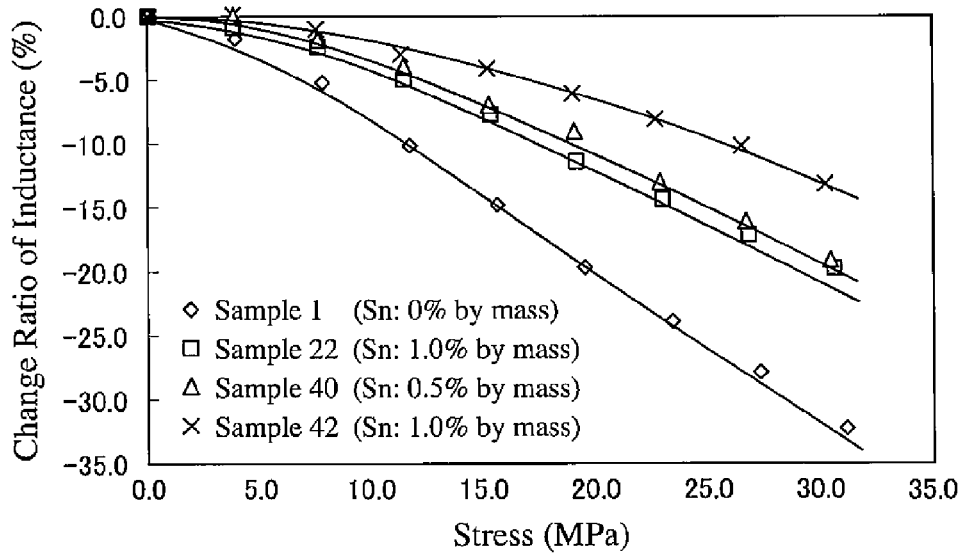
FIG. 12 is a graph showing the change ratio of inductance by stress in ferrites having different Sn contents.
Figure 13:
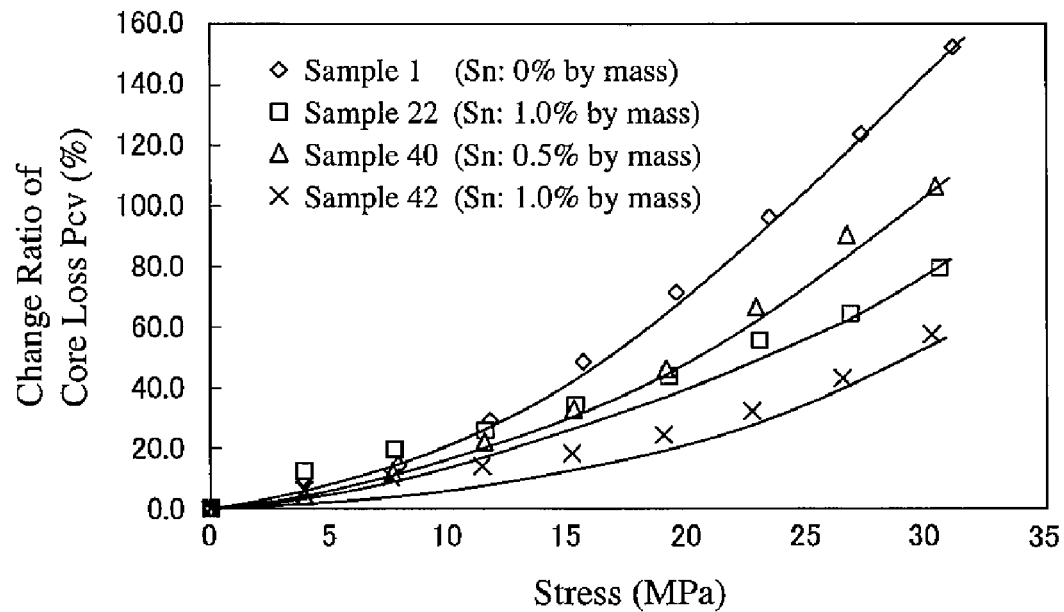
FIG. 13 is a graph showing the change ratio of core loss by stress in ferrites having different Sn contents.

FIG. 12 shows the stability of inductance under stress, and FIG. 13 shows the stability of core loss under stress. As the amount of Sn increased, the change ratios of inductance and core loss under stress decreased.

Example 2

The laminated inductor 10a shown in FIGS. 1(a)-1(d) was produced by the following procedures. Each ferrite powder of Samples 1 and 6 was pulverized together with a polyvinyl-butyral-based binder and ethanol by a ball mill, and with viscosity adjusted, the resultant slurry was coated on a polyester film by a doctor blade method to form green sheets 21 each having a dry thickness of 30 μm. Each of five green sheets 21 was printed with an Ag paste to form pluralities of substantially one-turn, coil-shaped conductor patterns 30 as thick as 30 μm, thereby forming a sheet having first coil-shaped conductor patterns. A green sheet 21 was printed with an Ag paste to form pluralities of substantially 0.5-turns, coil-shaped conductor patterns 30 as thick as 30 μm, thereby forming a sheet having second coil-shaped conductor patterns.

Figure 1B:
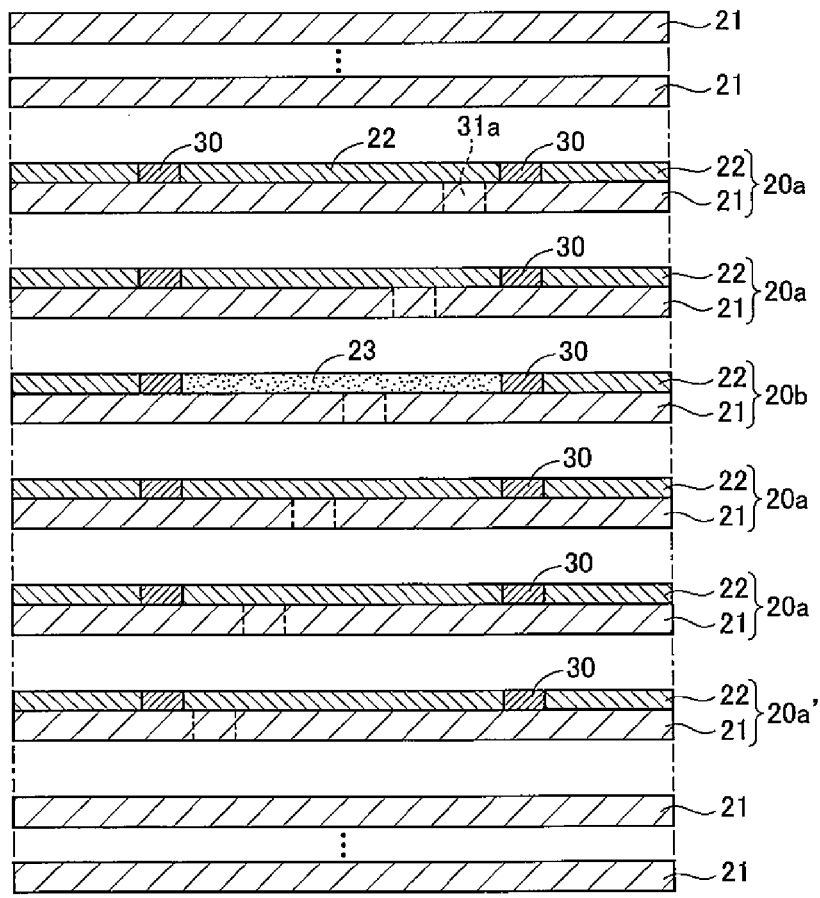

The coil-shaped conductor patterns 30l should be as thick as 20 μm or more to reduce DC resistance, but such large thickness provides large difference in height between regions having the coil-shaped conductor patterns 30 and those without conductor patterns 30, resulting in insufficient bonding of green sheets 21, and thus higher likelihood of delamination. Thus, as shown in FIG. 1(b), each of four sheets having the first coil-shaped conductor patterns was printed with a ferrite paste 22 in surface regions having no coil-shaped conductor patterns 30 to substantially the same thickness as that of the coil-shaped conductor patterns 30, thereby forming a composite sheet 20a having coil-shaped conductor patterns. The remaining one first sheet having coil-shaped conductor patterns was printed with a ferrite paste 22 and a non-magnetic ceramic paste 23 for a magnetic gap layer in surface regions outside and inside the coil-shaped conductor patterns 30, to substantially the same thickness as that of the coil-shaped conductor patterns 30, thereby forming a composite sheet 20b having coil-shaped conductor patterns and a magnetic gap layer. Further, the second sheet having coil-shaped conductor patterns was printed with a ferrite paste 22 in surface regions having no coil-shaped conductor patterns 30 to substantially the same thickness as that of the coil-shaped conductor patterns 30, thereby forming a composite sheet 20a' having coil-shaped conductor patterns. The ferrite paste 22 comprised the same ferrite powder as described above, ethylcellulose and a solvent, and the non-magnetic ceramic paste 23 comprised $ZrO_2$ powder, ethylcellulose and a solvent.

Figure 1C:
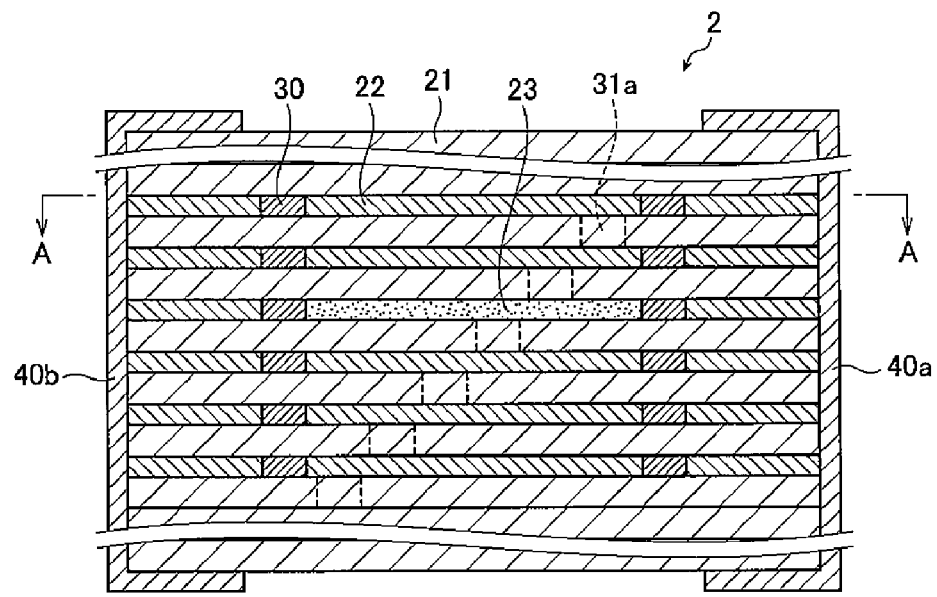
Figure 1D:
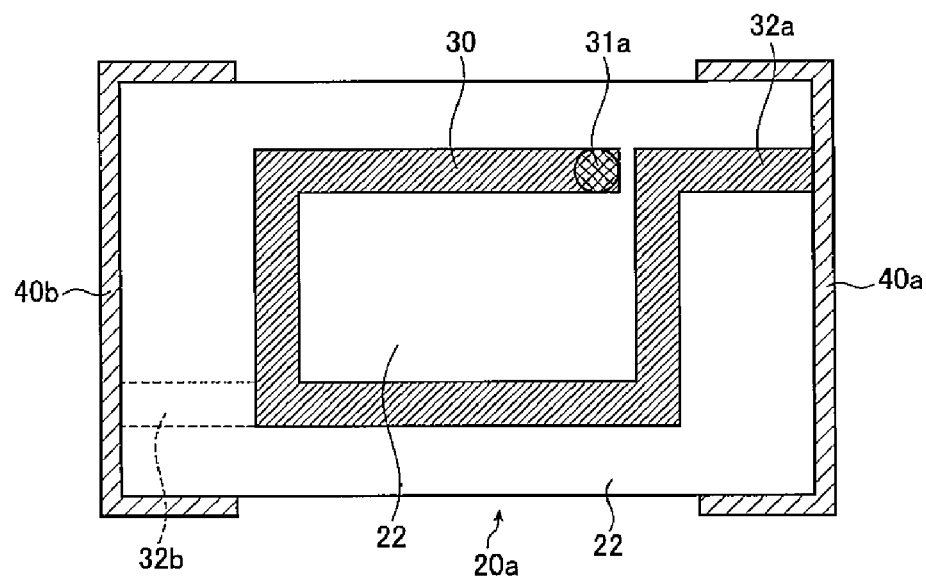

As shown in FIGS. 1(b) and 1(c), four composite sheets 20a having coil-shaped conductor patterns, one composite sheet 20b having coil-shaped conductor patterns and a magnetic gap layer, and one composite sheet 20a' having coil-shaped conductor patterns were laminated between pluralities of green ferrite sheets 21, such that the composite sheet 20b having coil-shaped conductor patterns and a magnetic gap layer were located substantially in the middle. Among the sheets 21 having coil-shaped conductor patterns 30, the uppermost and lowermost sheets 21, 21 were provided with lead wires 32a, 32b by an Ag paste between the ends of the coil-shaped conductor patterns 30 and the side surfaces. As shown in FIG. 1(d), because each sheet 21 had via-holes 31a each at a position corresponding to the end of a coil-shaped conductor pattern 30, the via-holes 31a were filled with an Ag paste to connect coil-shaped conductor patterns 30, 30 in the adjacent sheets 21, 21, thereby forming a coil 3.

The resultant laminate was cut to such a size that became 2.0 mm×1.2 mm×10 mm after sintering, deprived of a binder, and then sintered at 900° C. for 3 hours in the air. As shown in FIG. 1(d), an Ag paste was coated on side surfaces on which the lead wires 32a, 32b were exposed, and baked at 600° C. to form external terminals 40a, 40b. Thus obtained was a laminated inductor 10a containing a 5.5-turn coil 3 in the laminate 2.

Figure 14:
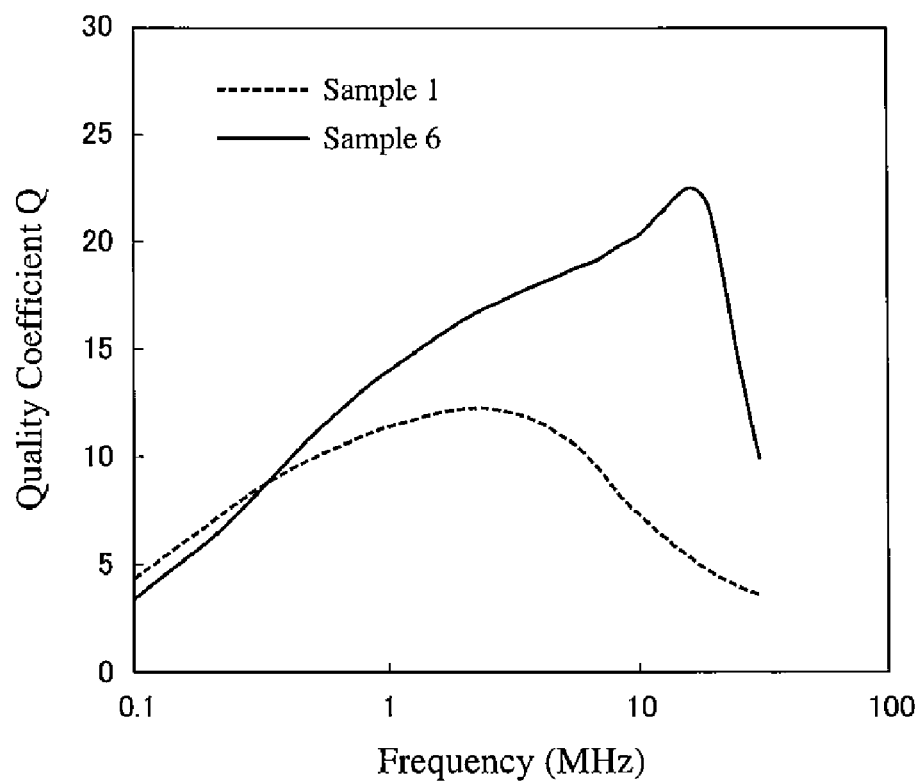
FIG. 14 is a graph showing the frequency characteristics of a quality coefficient Q in laminated inductors formed by the ferrites of Sample 1 (outside the present invention) and Sample 6 (within the present invention).

FIG. 14 shows the frequency characteristics of a quality coefficient Q in the laminated inductors 10a of Samples 1 and 6. The laminated inductor of Sample 6 had a high quality coefficient Q at higher frequencies than 1 MHz, and its peak was 10 MHz or higher.

Example 3

Using the ferrite powder of Sample 6, a laminated inductor was produced in the same manner as in Example 2 except that Zn ferrite having a composition of 48.5% by mol of $Fe_2O_3$, 42.7% by mol of ZnO and 8.8% by mol of CuO and a Curie temperature Tc of −60° C. or lower was used for the non-magnetic ceramic paste. The laminated inductor was placed in a constant-temperature chamber to continuously measure inductance at a temperature from −40° C. to +140° C., at a frequency of 1 MHz and current of 1 mA. The change ratio $L_R$ of inductance was calculated by the following formula:

$$L_R=(L_{Tn}-L_{T20})/L_{T20}\times100(\%),$$

$L_{Tn}$: Inductance at n ° C., and
$L_{T20}$: Inductance at 20° C.

Figure 15:
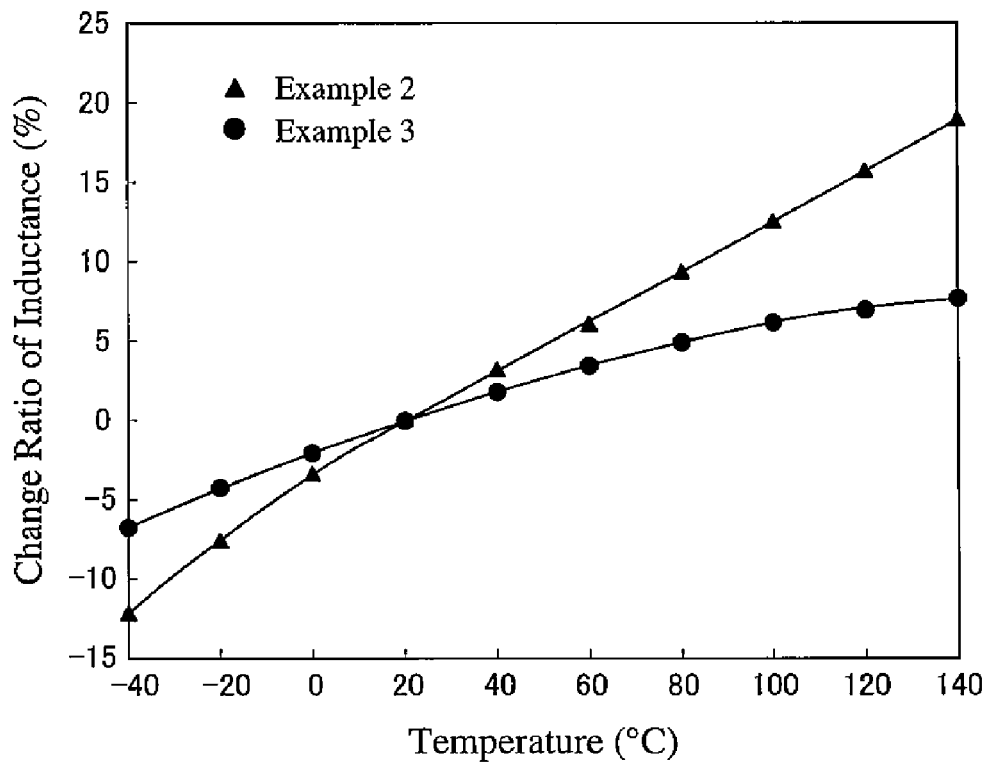
FIG. 15 is a graph showing the change ratio of inductance by temperature in a laminated inductor formed by the low-loss ferrite of the present invention.

FIG. 15 shows the temperature characteristics of the change ratio $L_R$ of inductance. FIG. 15 also shows the temperature characteristics of the laminated inductor obtained in Example 2. It is clear from FIG. 15 that the use of Zn ferrite for a magnetic gap reduces inductance change due to the temperature change. EPMA of a magnetic-gap-containing region in a lamination-direction cross section of the laminated inductor revealed the formation of boundary layers, in which the Zn content changed continuously, on both sides of the magnetic gap. The thickness of the boundary layer was substantially 15 μm, and the thickness of the magnetic gap including both boundary layers was substantially 50 μm.

Example 4

Figure 16:
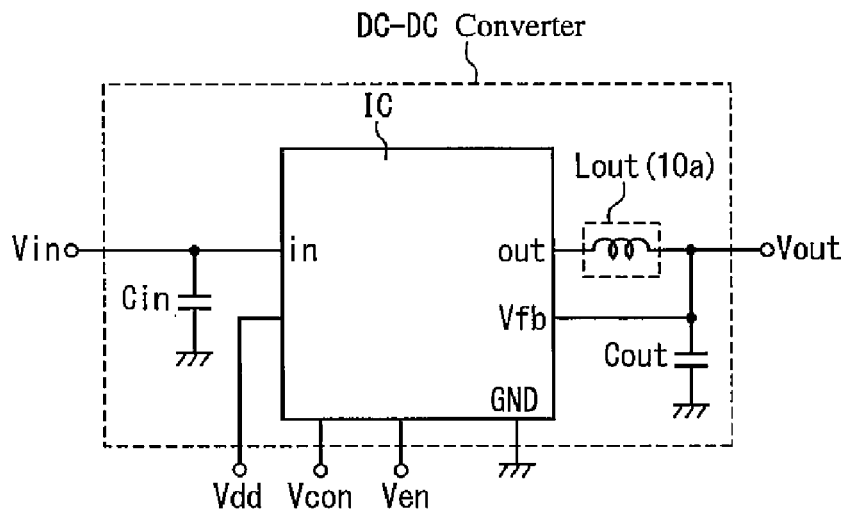
FIG. 16 is a view showing the equivalent circuit of a DC/DC converter.
Figure 17:
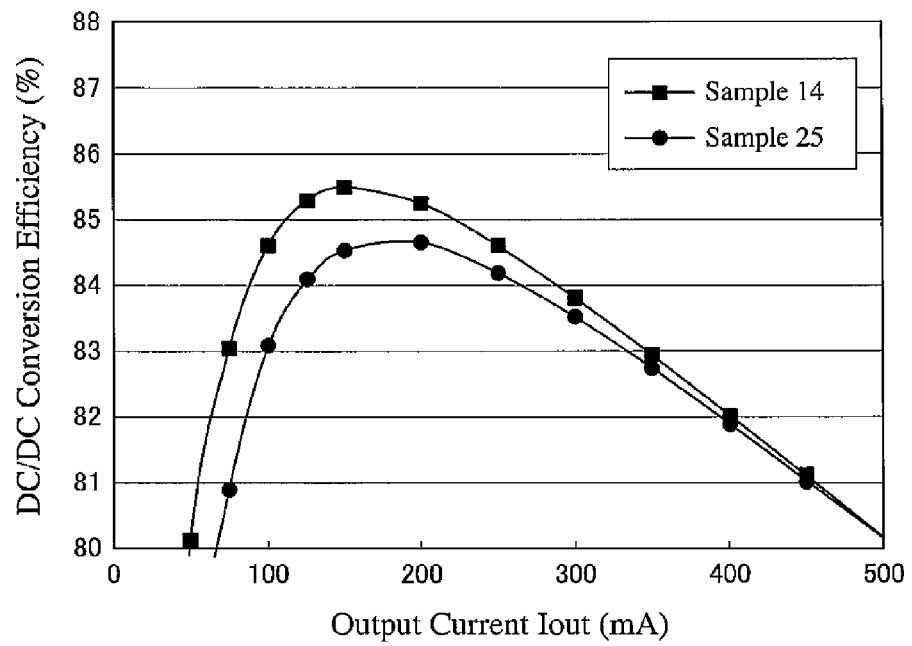
FIG. 17 is a graph showing the DC/DC conversion efficiency characteristics of DC/DC converters comprising laminated inductors formed by the ferrites of Sample 14 (within the present invention) and Sample 25 (outside the present invention).
Figure 18:
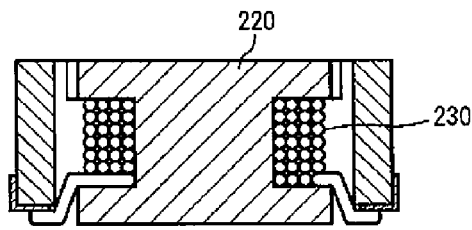
FIG. 18 is a cross-sectional view showing an example of inductors, which has a wire wound around a ferrite core.
Figure 19:
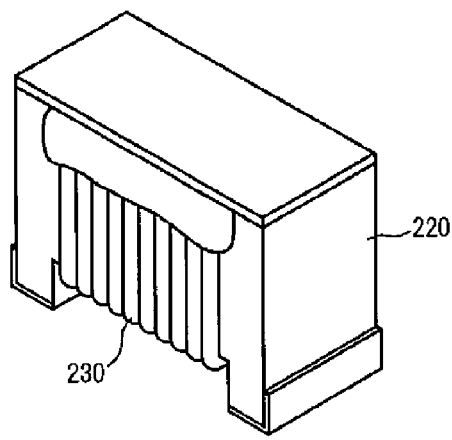
FIG. 19 is a perspective view showing another example of inductors, which has a wire wound around a ferrite core.

Using each ferrite powder of Samples 14 and 25, a laminated inductor 10a was produced in the same manner as in Example 2. Each laminated inductor 10a was assembled in the step-down DC/DC converter shown in FIG. 16 (switching frequency fs: 8 MHz, input voltage Vin: 3.6 V, and output voltage Vout: 1.8 V), to measure DC/DC conversion efficiency. The results are shown in FIG. 17. As is clear from FIG. 17, Sample 14 within the present invention exhibited higher DC/DC conversion efficiency than that of Sample 25 outside the present invention. This appears to be due to the fact that Sample 14 had low loss.

Although explanation has been made above with respect to the laminated inductor as an example of the electronic device, the present invention is not restricted thereto, and various modifications may be made unless deviating from the scope of the present invention. For instance, as shown in FIG. 2, semiconductor-integrated circuit parts IC and capacitors Cin, Cout may be mounted onto the electrodes of an inductor-containing laminate substrate 10b to have electric connection to the inductor, thereby providing a DC/DC converter module. Alternatively, the laminated inductor and semiconductor-integrated circuit parts IC may be mounted onto a capacitors-containing substrate to provide a module. In the production method of the laminated inductor, a ferrite-paste-printing method may be used in place of a sheet-forming method.

EFFECT OF THE INVENTION

The low-loss ferrite of the present invention is sinterable at temperatures equal to or lower than the melting point (960° C.) of Ag, exhibits low loss even at high frequencies of 10 MHz, and suffers little variation of characteristics under stress. Accordingly, the electronic devices such as laminated inductors, etc. using the low-loss ferrite of the present invention have excellent Q values at high frequencies.

What is claimed is:

1. Low-loss Ni—Cu—Zn ferrite comprising as main components 46.5-49.5% by mol of $Fe_2O_3$, 17-26% by mol of ZnO, 4-12% by mol of CuO, and 0.2% or more and less than 1.2% by mol of CoO, the balance being NiO, and comprising as a sub-component 0.03-1.4% by mass (as $SnO_2$) of Sn based on 100% by mass of said main components, the low-loss Ni—Cu—Zn ferrite having stability under stress, and having an average crystal grain size of 0.7-2.5 µm.

2. The low-loss Ni—Cu—Zn ferrite according to claim 1, which further comprises, as sub-components, 0.2% or less by mass (as $V_2O_5$) of V and/or 1% or less by mass (as $Mn_3O_4$) of Mn, based on 100% by mass of said main components.

3. The low-loss Ni—Cu—Zn ferrite according to claim 2, wherein the V content is less than 0.1% by mass as $V_2O_5$.

4. The low-loss Ni—Cu—Zn ferrite according to claim 1, which has core loss of 5000 $kW/m^3$ or less at a frequency of 10 MHz, an operating magnetic flux density Bm of 20 mT, and initial permeability $\mu_i$ of 70 to 174 at 1 MHz and 20° C.

5. The low-loss Ni—Cu—Zn ferrite according to claim 1, which has a saturation magnetic flux density of 290 mT or more in a magnetic field of 4000 A/m at 120° C.

6. The low-loss Ni—Cu—Zn ferrite according to claim 1, wherein both of a relative temperature coefficient $\alpha\mu_{ir1}$ of initial permeability $\mu_{i1}$ between −40° C. and +20° C., and a relative temperature coefficient $\alpha\mu_{ir2}$ of initial permeability $\mu_{i2}$ between +20° C. and +80° C. are positive values of +35 ppm or less.

7. An electronic device comprising a magnetic core formed by the low-loss Ni—Cu—Zn ferrite recited in claim 1, and a coil wound around said magnetic core.

8. An electronic device obtained by integrally sintering a laminate having pluralities of layers formed by the low-loss Ni—Cu—Zn ferrite recited in claim 1, and a coil-shaped electrode formed in said laminate.

9. An electronic device obtained by integrally sintering a laminate having pluralities of layers of low-loss Ni—Cu—Zn ferrite and at least one non-magnetic layer of Zn ferrite having a Curie temperature of −50° C. or lower, and a coil-shaped electrode formed in said laminate; said low-loss Ni—Cu—Zn ferrite comprising $Fe_2O_3$, ZnO, CuO, CoO and NiO as main components, and SnO as a sub-component, having a relative temperature coefficient $\alpha\mu_{ir1}$ of initial permeability $\mu_{i1}$ between −40° C. and +20° C. and a relative temperature coefficient $\alpha\mu_{ir2}$ of initial permeability $\mu_{i2}$ between +20° C. and +80° C., both of which are +10 ppm to +35 ppm, and having initial permeability of $\mu_i$ of 70 to 174 at 1 MHz and 20° C.; and said non-magnetic layer functioning as a magnetic gap.

10. The electronic device according to claim 9, wherein said low-loss Ni—Cu—Zn ferrite has core loss of 5000 $kW/m^3$ or less at a frequency of 10 MHz and an operating magnetic flux density Bm of 20 mT.

11. The electronic device according to claim 8, wherein semiconductor devices including a switch device are mounted onto surface electrodes of said laminate.

12. The electronic device according to claim 9, wherein semiconductor devices including a switch device are mounted onto surface electrodes of said laminate.

* * * * *